May 25, 1937.  A. J. ROHNER  2,081,713
COMPENSATOR FOR VARIATIONS OF PLATE CURRENTS
Filed June 1, 1933
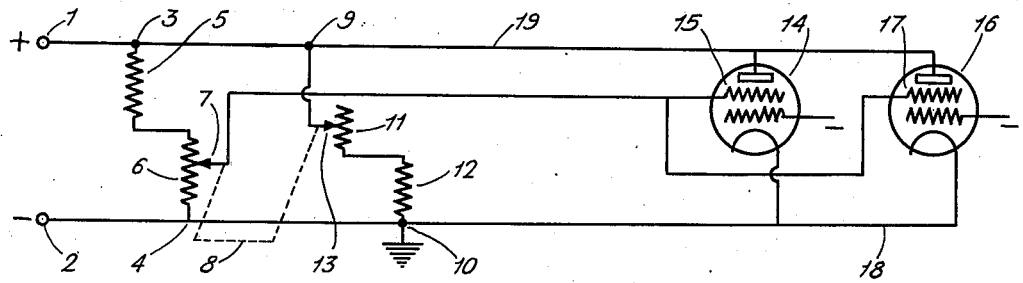
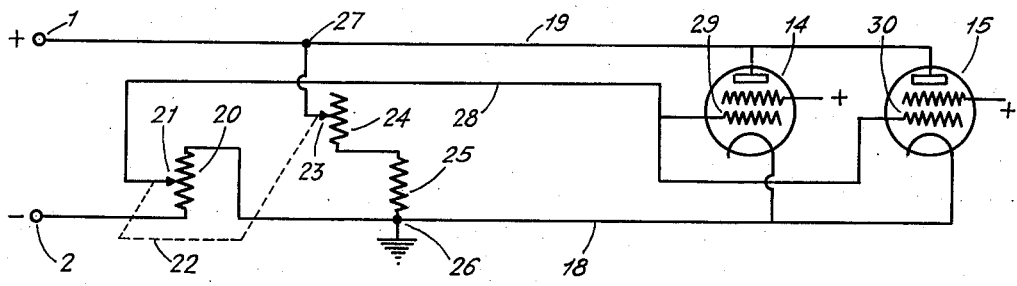
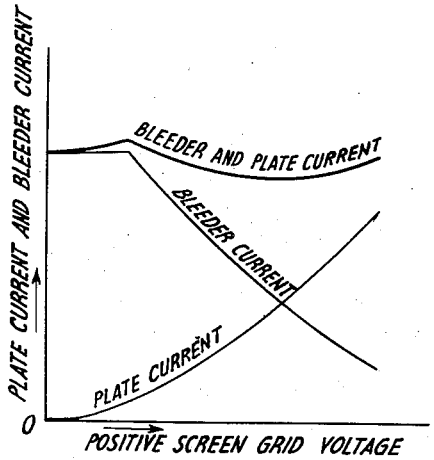
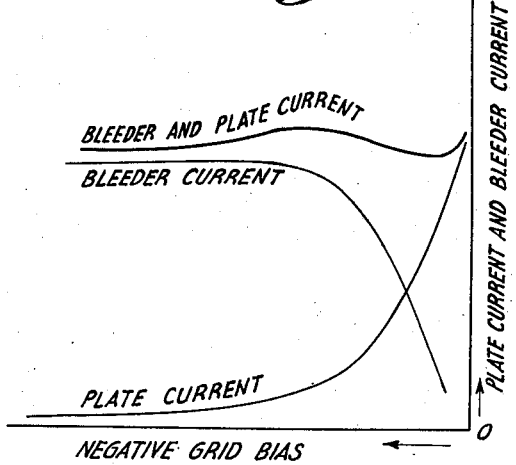
INVENTOR
ARNOLD J. ROHNER
BY
ATTORNEY Patented May 25, 1937

2,081,713

UNITED STATES PATENT OFFICE 2,081,713

COMPENSATOR FOR VARIATIONS OF PLATE CURRENTS

Arnold J. Rohner, Haddon Heights, N. J., assignor to Radio Corporation of America, a corporation of Delaware Application June 1, 1933, Serial No. 673,885

6 Claims. (Cl. 179—171)

The present invention relates to amplifiers and the like and particularly to amplifiers utilizing thermionic tubes energized from commercially available alternating current. In such systems the alternating current is rectified and filtered before it is supplied to the grid and anode electrodes of the tubes. However, it is customary to supply the heater circuits for the cathodes of the tubes especially when indirectly heated cathode tubes are provided with raw alternating current. In such systems, when the amplifier tubes are of the multi-grid type the amplification characteristics of the tubes may be varied for instance, by varying the positive potential applied to an auxiliary grid or by varying the negative grid bias potential on the control grid. The latter type of control may be applied to ordinary triodes. Since the anode and the various grids of the tube derive their respective potentials from the same source it is seen that variations of one potential to control the amplification characteristics of the tube will obviously affect the aggregate load on the common source with the result that the potentials supplied to the other electrodes therefrom are caused to vary, and if a rectifier tube is used to rectify the alternating current, it is obvious that the total current drawn from the rectifier circuit will vary.

In certain types of sets, especially precision receivers wherein the values of the potentials applied to the elements of the tubes are critical, it is obvious that even the small changes resulting from the aforesaid amplification varying means cannot be tolerated.

It is an object of the present invention to devise a system wherein the voltage applied to any one or more electrodes of an electronic tube or tubes may be varied without appreciably affecting the potentials on the other electrodes thereof.

In accordance with the invention the total current drawn from the power supply circuit is maintained constant irrespective of changes of the control grid bias and/or the auxiliary grid potential for volume control purposes by that a so-called variable bleeder circuit is employed. The bleeder circuit is connected across the rectifier output circuit and is arranged so as to compensate for changes in the plate current drawn by the amplifier tube or tubes and thus maintain the total load on the rectifier constant.

It is a further object of the present invention to operate the variable bleeder circuit by the same means as is used to operate the volume control device of the receiver, variations in the amplification factor of the tube being controlled with respect to the variations caused in the bleeder circuit in such a way that the current through the bleeder circuit increases as the plate current decreases and vice versa.

Other objects of the present invention will be apparent from the following detailed specification when read in conjunction with the appended drawing wherein, Figure 1 represents in diagrammatic form a preferred form of the invention as embodied in an amplifier wherein the amplification characteristics thereof are varied by means of changing the potential applied to an auxiliary electrode of the amplifier tubes;

Figure 2 is a curve sheet used to explain certain features of the invention in connection with the system shown in Figure 1;

Figure 3 represents in diagrammatic form a circuit arrangement wherein the invention is employed in a system utilizing thermionic tubes, the amplification characteristics of which are varied by changing the control grid bias potentials; and, Figure 4 is a curve sheet used to explain the characteristics of the system shown in Figure 3.

In Figure 1, terminals 1 and 2 are the usual terminals for connecting the tubes of a receiver or the like to a power supply system. It is to be understood that the power supply system may comprise a rectifier either of the full wave or half wave type and filter circuit in which case the terminals 1 and 2 are connected to the output terminals of the usual filter circuit. It is to be understood that the line connected to terminal 1 is the positive conductor, whereas, the line connected to terminal 2 is the negative conductor. Two tubes 14 and 16 which are representative of an amplifier arrangement are shown connected to the power supply system.

While tubes 14 and 16 have been shown generally as screen grid tubes it is to be understood that any tube capable of having its characteristics changed by varying the potential applied to one or more electrodes thereof may be employed.

It is obvious from the drawing that the anodes of the two tubes 14 and 16 are connected to the positive conductor, whereas, one side of the equi-potential cathode of each tube is connected to the negative side. The heater circuits for the cathodes have not been shown, however, it is intended that the usual type heater circuit be employed.

The amplification characteristics of the tubes 14 and 16 may be varied by means of changing the positive potential applied to the auxiliary electrodes 15 and 17 respectively as follows:

Connected across the line 19 and 18 there is provided a fixed resistance 5 in series with a fixed resistance 6. Fixed resistance 6 is provided with a cooperating movable tap 7 which in case it is desired to provide both electrodes 15 and 17 with the same potentials is connected to each of the auxiliary electrodes 15 and 17. It is obvious that by varying the position of the tap 7 on the resistance 6 the potential applied to the auxiliary electrodes 15 and 17 may be varied thereby varying the amplification characteristics of the tubes 14 and 16. The bleeder circuit comprises a variable resistance 11 and a fixed resistance 12 shunted across the conductors 18 and 19 through a variable tap 13 associated with the resistance 11. Tap 13 is for the purposes of varying the value of the resistance 11 which is placed in series with resistance 12 across the line. It should be noted that the lower point 10 of the resistance 12 is grounded. A uni-control means represented generally at 18 is arranged so as to allow simultaneous adjustments of the two variable elements 7 and 13. The system is arranged so that as the screen voltage is increased by moving tap 7 upwardly along the resistance 6 the plate current would normally increase; however, by means of the mechanical connection 8 to the variable element 13 more resistance 11 is cut in to the circuit 9, 10 with the result that the current through path 9, 10 decreases thereby maintaining the load across the terminals 1, 2 substantially constant.

Referring now to Figure 2, the curve denoted by "plate current" shows that the plate current through the tubes increases as the screen grid voltage increases, that is, becomes more positive with respect to the cathode. At the same time, the bleeder current decreases, hence, the load placed on the rectifier circuit is substantially constant as is shown by the bleeder and plate current curve.

In Figure 3, the amplification control is obtained by varying the bias on the grids 29 and 30 of the tubes 14 and 15 respectively. For this purpose the grids are connected to bias resistance 20 through a variable tap 21. The bleeder circuit 27, 26 includes the fixed resistance 25 and the variable resistance 24 cooperating with the variable tap 23. A mechanical inter-connection shown generally at 22 is provided for simultaneous adjustment of variable taps 21 and 23.

The curves shown in Figure 4 illustrate the operation of the system shown in Figure 3. It is obvious from Figure 4 that as the negative grid bias increases the plate current normally decreases. However, through the mechanical inter-connection between taps 21 and 23 the bleeder current increases, hence, the total load across the terminals 1 and 2 is maintained substantially constant as is shown by the "bleeder and plate current" curve of said Figure 4.

It is to be understood that the scope of the present invention is to be limited only by the prior art and the scope of the appended claims and not by the particular embodiments shown herein.

I claim:

1. In combination with a space discharge device provided with anode, cathode and grid electrodes, a source of space current for said device, an impedance in series with said source, a variable tap on said impedance and a connection between said tap and a grid electrode of said device, a variable bleeder resistance shunted across said source provided with a controlling element and a common mechanism associated with both said variable tap and the controlling element to permit simultaneous adjustment of both the tap and the element.

2. In combination with a source of current, a load circuit therefor comprising a pair of variable conductance paths connected in parallel with respect to the source, one of said paths comprising the space path of a space discharge device, separate means for varying the conductance of each of said paths, one of said last named means including said source of current, and a single element common to each of said separate means for simultaneously operating said separate means and arranged so as to vary the conductance of each of said paths with respect to the other thereof in substantially equal increments but in opposite sense to thereby maintain the load across said source due to said load circuit substantially constant despite variations in said conductances.

3. In an amplifier circuit, a space discharge device provided with anode, cathode and grid electrodes, a source of space current for said device, means for varying the amplification characteristics of said device by controlling the flow of space current through said device, a bleeder circuit connected across said source, means for controlling the flow of current through said bleeder circuit, a common element associated with both said last named means to permit simultaneous operation thereof in a sense to maintain constant the load on said source despite variations in the flow of space current through said device.

4. In combination with an amplifier including a plurality of space discharge devices, a source of current for energizing said devices, means for varying the amplification characteristics of said amplifier whereby the current taken by said devices from said source is varied, an auxiliary load circuit associated with said source and means for simultaneously varying the loading characteristics of said auxiliary circuit with variations in the amplification characteristics of the amplifier in a sense to maintain the total load on said source substantially constant.

5. In an amplifier circuit a space discharge device provided with anode, cathode and grid electrodes, a source of space current for said device, means for varying the amplification characteristics of said device by varying the potential applied to one of the electrodes thereof, a bleeder circuit connected across said source, means for controlling the flow of current through the bleeder circuit, and a common element connected with both said last named means to permit simultaneous operation thereof in a sense to maintain constant the load on the source despite variations in the flow of space current through said devices due to variations in the amplification characteristics thereof.

6. In combination with a source of current, a variable impedance shunted across the source, said impedance being provided with a controlling element, a second impedance shunted across the source comprising the space path of an electronic tube, said tube being provided with a control electrode, a resistance device in series with the source and the space path of the tube, a variable tap on said resistor device, a connection from said grid to said tap and a common means connected with both said controlling element and said variable tap to permit simultaneous adjustment of both thereof to vary the amplification characteristics of the electronic tube and at the same time maintain the load across the source substantially constant.

ARNOLD J. ROHNER.